United States Patent [19]

Evans

[11] Patent Number: 5,595,469

[45] Date of Patent: Jan. 21, 1997

[54] TRANSPORTER FOR HEAVY LOADS

[75] Inventor: Glen A. Evans, Garwood, N.J.

[73] Assignee: Lucent Technologies Inc., Murray Hill, N.J.

[21] Appl. No.: 350,301

[22] Filed: Dec. 6, 1994

Related U.S. Application Data

[62] Division of Ser. No. 164,071, Dec. 8, 1993, Pat. No. 5,449,266.

[51] Int. Cl.⁶ ..................................................... B60P 3/00
[52] U.S. Cl. ........................... 414/458; 280/42; 254/10 R; 414/917
[58] Field of Search ................................. 414/495, 498, 414/458, 459, 460, 461, 917, 589; 254/10 R, 10 B, 10 C, 9 R, 9 B, 9 C; 187/222; 280/42

[56] References Cited

U.S. PATENT DOCUMENTS

| | | | |
|---|---|---|---|
| 111,104 | 1/1871 | Brown | 254/10 R |
| 442,891 | 12/1890 | Hite | 254/10 R |
| 1,129,775 | 2/1915 | Anthony | 254/10 C |
| 2,513,440 | 7/1950 | Alderson | 254/10 C X |
| 2,628,068 | 2/1953 | Sehnert | 254/10 C |
| 2,931,519 | 4/1960 | Beach | 414/589 |
| 3,536,220 | 10/1970 | Cloker | 414/458 |
| 3,781,030 | 12/1973 | Ekedal | 280/42 X |
| 4,522,548 | 6/1985 | Oswald et al. | 414/589 X |
| 4,619,464 | 10/1986 | Hwang | 280/42 X |
| 4,693,660 | 9/1987 | La Croix | 414/458 |

FOREIGN PATENT DOCUMENTS

| | | | |
|---|---|---|---|
| 491789 | 9/1938 | United Kingdom | 254/10 C |

*Primary Examiner*—Frank E. Werner

[57] ABSTRACT

A transporter vehicle comprises two lifting devices which carry respective jacks and which can be joined at their ends by cross bars to form a rectangular dolly with a central opening therein. The lifting devices each have front and rear wheels so that the dolly can be rolled on floor surfaces. In practice, the two are placed on opposite sides of a load seated on a floor in the opening between those devices, the jacks are placed under the load, the cross bars are assembled with the side frames, the load is jacked up on its opposite sides to be above the floor and the load may then be transported.

2 Claims, 4 Drawing Sheets

TRANSPORTER FOR HEAVY LOADS

This is a division of application Ser. No. 08/164,071 filed Dec. 8, 1993, now U.S. Pat. No. 5,449,266.

FIELD OF THE INVENTION

This invention relates, generally, to vehicles for transporting loads between locations and, more particularly, to dollies and other hand propelled vehicles which are primarily used to transport loads over floors within buildings or otherwise over relatively short distances, and which incorporate hand actuated means for lifting a load off the floor to become supported by the vehicle.

BACKGROUND OF THE INVENTION

One such hand propelled vehicle which is now commercially available is a hand propelled "desk dolly" which comprises a wheeled platform movable over the floor by hand, a frame of lightweight steel members disposed over, and mounted by, and covering a greater horizontal area than, the platform, and a mechanical jack by which the frame can be adjusted up and down relative to the platform. In use, the dolly is pushed into the space forming the bay beneath the desk, the frame is jacked up to lift the desk off the floor, and the desk is then transported by rolling the dolly over the floor. The "desk" dolly just described has the disadvantage of lack of versatility in that the large areal size of its frame and the fact that it cannot be lowered below the platform makes it unsuitable for the lifting of many loads.

Another such hand propelled vehicle is a hand truck having a pair of swivelable wheels at its bottom and having thereon an outwardly projecting lifting shoe which, when the truck is mostly upright, is at the truck's bottom and is shiftable between fully lowered and raised positions by a hydraulic jack on the truck. To lift a heavy load seated on the floor, two of such trucks are brought to opposite sides of the load to insert their respective shoes under it, the hydraulic jacks of both trucks are then operated to shift their respective shoes simultaneously from their lowered positions to raised positions at which time the shoes are held to thereby lift and hold the load off the floor, and the two trucks are then tied together by flexible fabric belts to form with the load an assemblage which is movable over the floor to transport the load. A disadvantage of the arrangement just described is that the hydraulic jacks which are on the hand trucks are expensive. Further, two men are needed to lift the load simultaneously. Still further, because, after the load has been lifted, the two trucks are coupled together only by fabric belts, the resulting assemblage is at best a jury rig which provides support for the load which is less stable than a rigid support platform would provide and which, moreover, may be difficult to roll over the floor since all the wheels on the two trucks are swivelable.

SUMMARY OF THE INVENTION

One or more of the disadvantages described above as characterizing previous arrangements for listing a load off the floor and then transporting it are overcome by improvements according to the invention and of the character set out by the appended claims.

BRIEF DESCRIPTION OF DRAWINGS

For a better understanding of the invention, reference is made to the following description of an exemplary embodiment thereof, and to the accompanying drawings wherein.

Figure 1:
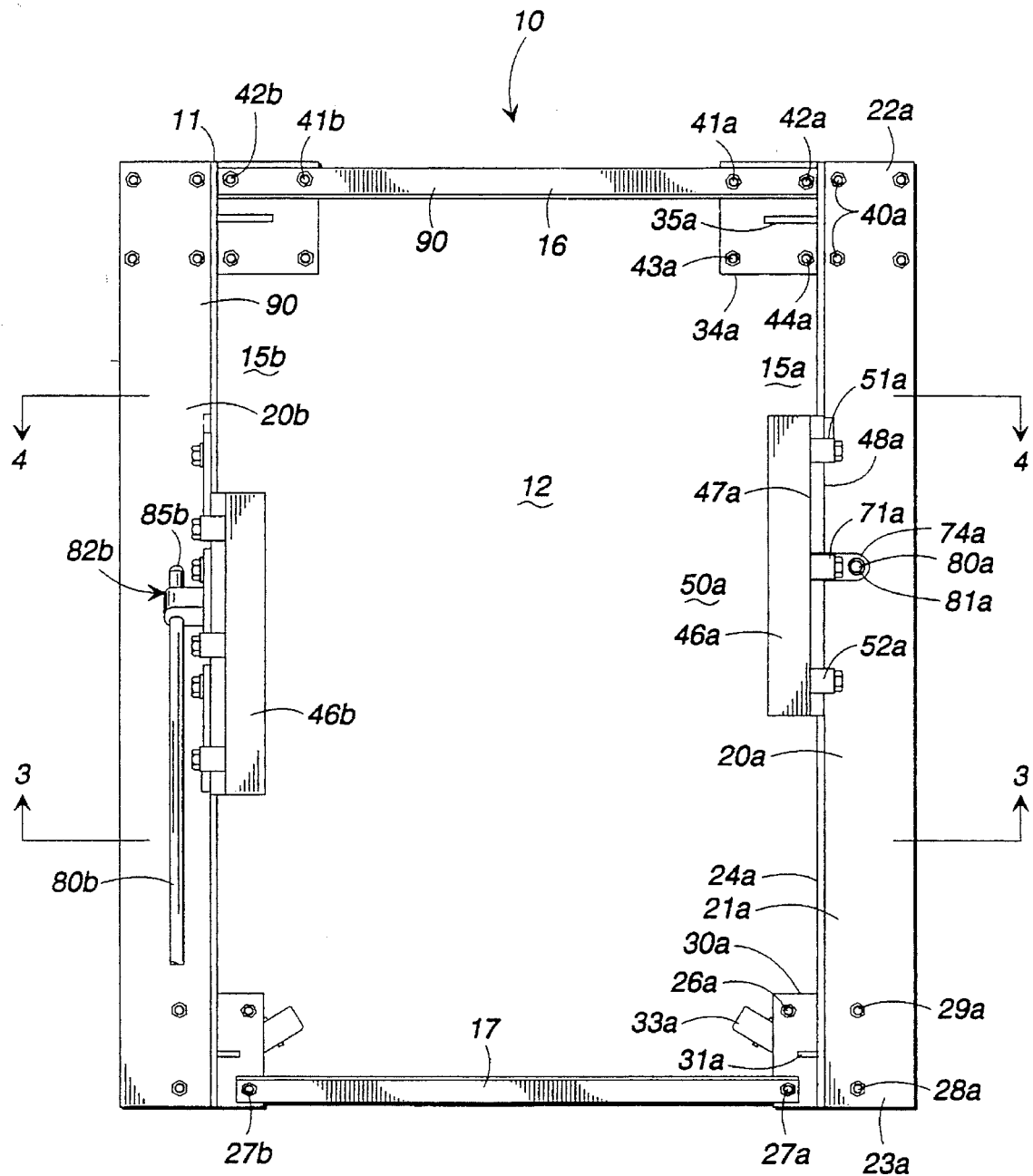
FIG. 1 is a plan view of a transporter vehicle according to the invention which comprises a dolly comprising two load lifting devices on the left and right sides of the dolly.

In the description which follows, elements which are counterparts of each other are designated by the same reference numerals while being distinguished from each other by different alphabetical or numerical suffixes for those numerals, and it is to be understood that, unless the context otherwise indicates, a description of any such elements is to be taken as equally applicable to all of its one or more counterparts. Moreover, while the specification and claims hereof may describe elements of the embodiment of the invention hereof as having certain spatial coordinates, (as being "horizontal" or vertical etc) it is to be understood that the invention hereof is not limited to particular spatial coordinates.

DETAILED DESCRIPTION OF THE EMBODIMENT

Referring now to FIG. 1, the reference numeral 10 designates a transporter vehicle according to the invention which, when assembled, comprises a dolly 11 comprising first and second load lifting devices 15a and 15b on the right and left sides (FIG. 1) of the dolly. The devices 15 are laterally spaced from each other in the horizontal plane to have therebetween an opening 12, and the devices are joined at their rear and front ends by rigid elongated tie means comprising rear and front tie bars 16, 17 both later described in more detail. The load lifting devices 15a and 15b are mirror images of each other but are otherwise substantially the same. Hence, only the device 15a will be described in full detail.

The lifting device 15a comprises support means provided by a horizontal beam 20a (FIG. 2) extending longitudinally between relatively forward and rearward positions 21a and 22a thereof. The beam 20a is an "L" shaped angle iron beam having an longitudinally elongated horizontal web 23a and a longitudinally elongated vertical web 24a upstanding from horizontal web 23a on its inner side, i.e., its side towards the other lifting device 15b. The beam 20a is supported above a floor 25 by wheel means now to be described.

Welded to the inner side of the beam 20 at its forward portion 21a is a horizontal shelf 30a (FIG. 1) having its underside flush with that of the beam web 23a. Shelf 30a is braced by a triangular web 31a extending between shelf 30 and the beam's vertical web 24a and welded to both. The shelf 30a and the adjacent portion of the beams horizontal web 23a provide a backing for a conventional swivelable-wheel caster 32a (FIG. 2) which has below its top a swivelable wheel 33a, and which is bolted at its top by bolts 26a–29a to that shelf and web.

Similarly, the beam 20a has welded thereto on its inner side at its rearward portion 22a a horizontal shelf 34a which is braced by a triangular web 35a extending between and welded to both the top of the shelf and the vertical web 24a of the beam, and the underside of which shelf 34a is flush with that of the underside of the horizontal web 23a of the beam. As a difference, however, from the single wheel provided at the beam's front, the backing provided by the rear shelf 34a and the adjacent portion of web 23a furnishes a mounting for two fixed-wheel conventional casters 36a and 37a (FIG. 3) bolted by bolts 40a, and 41a–44a (FIG. 1) at their tops to, respectively, the web 23a and the shelf 36a to be spaced from each other in the lateral direction, i.e., in the direction which is sidewise in relation to the longitudinal extent of beam 20a. The casters 36a and 37a are similar and they carry respective wheels 38a and 39a (FIG. 3) which rest on floor 25 and are not swivelable in the horizontal plane. The spacing between wheels 38a and 39a is significant for reasons later described. By virtue of lifting device 15a being provided with swivelable front wheel 33a and with fixed rear wheels 38a and 39a, the device is steerably rollable over floor 25.

The beam 20a of lifting device 15a carries between its forward and rearward portions 21a and 22a a lifting means of which one component is a metal shoe 50a, comprising a lower portion in the form of a horizontal lip 46a projecting inwards towards the other lifting device 15b from the bottom end of a vertical lift plate 47a abutting the inner side of the vertical web 24a of the beam and constituting another part of shoe 50a. Lip 46a and plate 47a may be formed by stamping or other other metal working from a single metal piece. As shown, lift plate 47a has fastened to it at its top on its outer side a horizontal shim 48a which overhangs the vertical web 24a of the beam and which shim projects out slightly beyond that web's outer side.

The shoe 50a is coupled to the beam 20a in a manner as follows. The lift plate 46a of shoe 50a has welded to its top a pair of "L" shaped brackets 51a and 52a (FIG. 1) which are longitudinally spaced from each other horizontally, and which have respective horizontal portions projecting outwardly from the lift plate and, also, respective vertical portions extending downwards from the outer ends of such horizontal portions to be disposed vertically opposite to, and horizontally spaced by respective gaps from, the shim 48a of the shoe 50a.

Disposed in those gaps are the upper ends of a pair of link arms 53a and 54a having unthreaded holes therein matched by registering unthreaded holes in the vertical portions of brackets 51a and 52a and matched, also, by threaded holes in shim 48a and in the lift plate 47a. Bolts 55a and 56a pass through those holes so that the heads of those bolts are on the outsides of the brackets 51a, 52a; unthreaded stem portions of those bolts are received within the arms 53a and 54a and shim 48a, and threaded, front-end stem portions of the bolts are received in the holes in the lift plate 46a to engage with the threads therein. The link arms 53a and 54a are thus pivotably coupled with the shoe 50a by the bolts 55a, 56a which serve as pivot pins for those arms.

The lower ends of link arms 53a, 54a are pivotably coupled in a similar manner to the beam 20a by (a) metal lugs 61a, 62a welded to and upstanding from the horizontal beam web 23a to be horizontally spaced from vertical beam web 24a by gaps in which those lower ends of those link arms are received, and by (b) bolts, 65a and 66a having stems of which unthreaded portions pass through unthreaded holes in those lugs and the lower ends of those arms, and of which threaded portions pass into holes in the vertical beam web 24a to engage within that web with threads in those last named holes.

Figure 2:
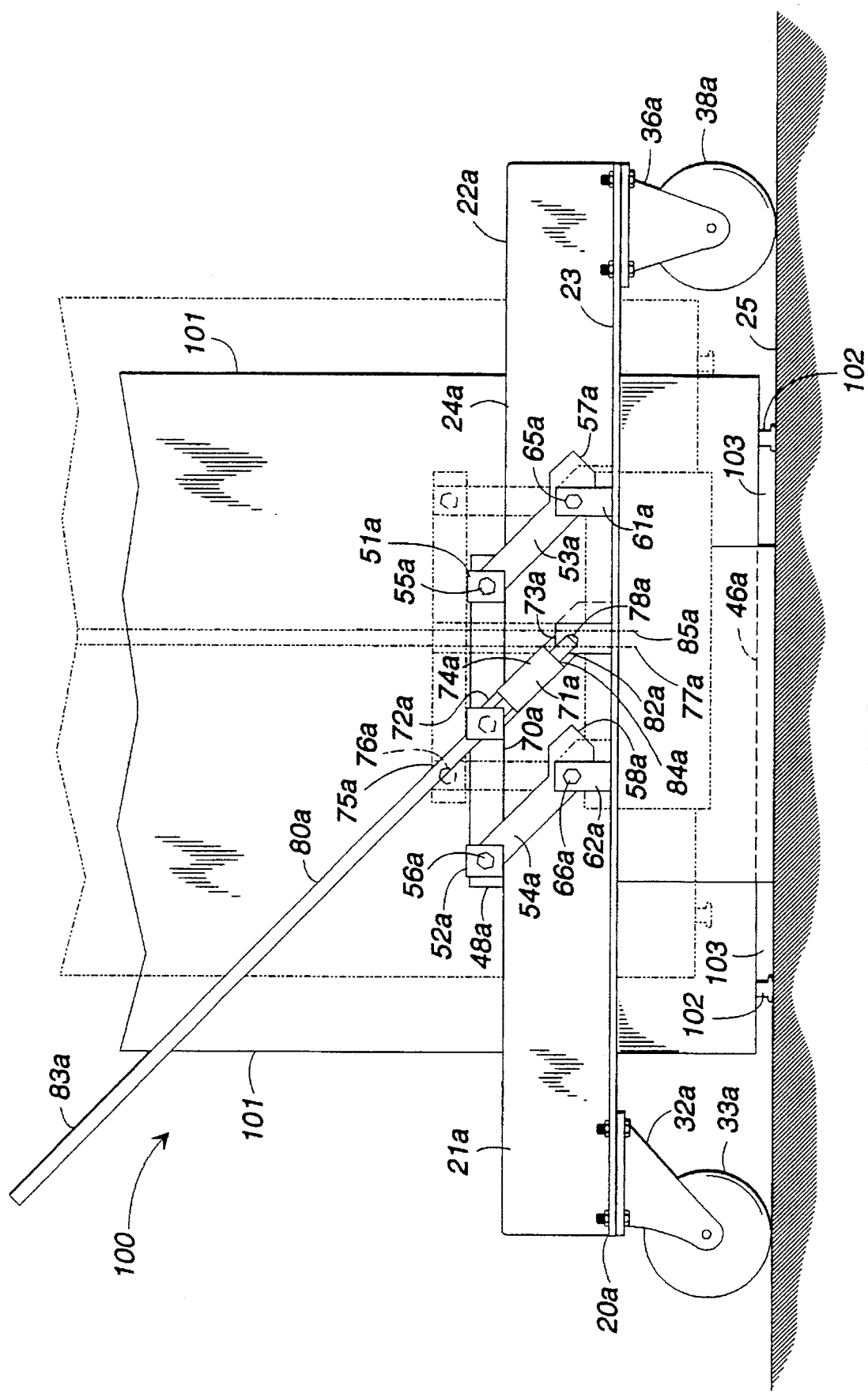
FIG. 2 is a right-side elevation of the FIG. 1 dolly which shows primarily the right load lifting device in both its ready condition (shown in solid line in FIG. 2) to lift a load (shown in phantom in FIG. 2) and the device's actuated condition (shown in phantom in FIG. 2 but in solid line in FIG. 1)

The bolts 65a and 66a are horizontally spaced from each other by the same distance as horizontally separates the bolts 55a and 56a. The link arms 53a and 54a thus couple together the beam 20a and the shoe 50a to form therewith a parallelogram linkage 70a. Such linkage is adjustable between different angular configurations therefor at which the angles made between the link arms and a horizontal line are different, but in which the sides of the linkage remain parallel. FIG. 2 shows in solid line a first non-orthogonal one of such configurations in which the arms 53a, 54a make an acute angle with the line between bolts 55a, 56a, and the lower portion of lip 46a of the shoe is in the down position. The same figure also shows in phantom a second orthogonal angular configuration of the linkage in which arms 53a, 54a make approximately a right angle with the horizontal line between bolts 55a, 56a, and the lip 46a is in up position.

The lower ends of the link arms 53a, 54a are shaped to provide those arms with respective elbows 57a, 58a which project outwardly and rearwardly from the main linking portions of those arms. As shown in FIG. 2, when the parallelogram linkage 70 is shifted to from its first (solid line) configuration to its second (phantom configuration), the elbows 57a, 58a pivot down into close proximity or engagement with the horizontal beam web 23a. In so doing the elbows 57a, 58a serve as stops preventing the linkage 70a. from being shifted rearward substantially past the point at which it reaches its orthogonal configuration.

The linkage 70a is shifted from its first to its second configuration by a force-multiplying lever arrangement of the following character. The earlier described arms 53a and 54a are supplemented by a load transfer arm 71a disposed longitudinally between and parallel to the arms 53a, 54a. Arm 71 is provided by a metal piece which is east or machined or otherwise formed to have two end portions 72a, 73a of the thickness of arms 53a, 54a and a raised central portion 74a projecting out from those end portions by several times their thickness. The upper end portion 72a of the transfer arm 71a is pivotably coupled to the shoe 50a (in a manner similar to the coupling to the shoe of arms 53a, 54a) by way of a bracket 75a on the shoe and a bolt 76a passing through unthreaded holes in the elements 75a, 72a and 48a and into a hole in the lift plate 47a to become threadedly engaged therein with that plate. The lower end portion 73a of transfer arms 71a is pivotably coupled to the beam 20a (in a manner similar to the coupling to that beam of the arms 53a, 54a) by way of a lug 77a on the beam and a bolt 78a passing through unthreaded holes in elements 77a, 73a and into a hole in vertical beam web 24a to threadedly engage with that web. Bolts 76a and 78a serve as pivot pins for the load transfer arm 71a. The center of upper bolt 76a for transfer arm 71a lies in the same horizontal line as do the center of the upper coupling bolts 55a and 56a for the link arms 53a, 54. Likewise, the centers of the lower coupling bolt 78a for the transfer arm 71a lies in the same horizontal line as do the centers of the lower coupling bolts 65a, 66a for link arms 53a, 54a. Also the line between the the centers of bolts 76a, 78a is of the same length as and parallel to the line between the centers of bolts 55a, 65a (or of bolts 56a, 66a). Hence load transfer arm 71a is a part of parallelogram linkage 70a forming in the linkage a third supplemental link arm.

The raised central portion 74a of load transfer arm 71a has formed therein, outward of the arm's flat end portions 72a, 73a, a circular cylindrical bore 81a extending through that central portion in the arm's lengthwise direction to make that raised portion a sleeve. Received within that bore with a sliding fit is the lower part of a long solid rod 80a extending upward from the sleeve 74a to the top 83a of the rod for a distance along the centerline of the rod on the order of 32 inches. Rod 80a serves as a handle and lever. Upward retraction of the rod from the bore in the sleeve 74a is prevented by a cotter pin 84a passing horizontally through the rod by way of a hole thereon disposed below the sleeve 74a but above the lower tip 82a of the rod.

The horizontal beam web 23a has formed therein a hole 85a disposed directly below the bore in the sleeve 74a when that sleeve is fully upright. When sleeve 74a is so upright, the rod 80a lowered to advance its tip 82a down into hole 85a until further downward movement of the rod is stopped by the cotter pin 84a contacting the mentioned beam web.

The positioning of rod tip 82a in hole 85a locks, except for play, the rod 80a in full vertical position (and, hence, the linkage 70 in orthogonal configuration) for reasons as follows. For any higher or lower position of the rod relative to the sleeve 74a, the rod 70a has a virtual pivot axis which coincides with the centerline of bolt 78a and around which the rod turns as the linkage 70a changes in angular position. That is, if the rod is positioned relative to the sleeve 74a to dispose the rod tip 82a just above beam web 23a, and the top 83a of the rod is then moved to the right or left (FIG. 2), the rod will pivot about that virtual axis to cause the rod's lower tip to move, respectively, left and right. When, however, the rod tip 82a is lowered into hole 85a and it is then tried to move the rod top to the right or left, the rod initially may undergo a slight pivoting about that axis, but the rod tip will then make contact with the metal interior wall bounding hole 85a on respectively, the frontward side and the rearward side of that hole to stop any further pivoting of the rod. Thus, when the rod tip 82a is inserted into hole 85a, the rod 80a is locked, except for slight play, from departing either forwards or rearwards from its full vertical position, and the parallelogram linkage is similarly locked in its orthogonal angular configuration.

With the shoe 50a initially being in down position (solid line in FIG. 2) and the rod 80a initially extending upward and leftward away from sleeve 74a, and linkage 70a being in its first non-orthogonal configuration, the rod is used as a handle to shift the linkage to its second orthogonal configuration and concurrently, the shoe 50a (and its lip 46a) to its up position. That is, manual force is exerted on the rod's top 83a to move it in an arc from left to right (FIG. 2) until the rod reaches its end position shown in phantom (FIG. 2). Such rod movement effects the shifting just mentioned of the linkage 70a and the shoe 50a and lip 46a thereon. In the course of such rod movement, the rod acts not only as a handle but also as a lever which operates with linkage 70a to increase greatly at the lip 46a by mechanical action (as contrasted to, say, hydraulic action) the amount of hand exerted force applied to the top 83a of the handle. The amount of increase of such force is given by the equation $$F_0 = \left( \frac{a}{h} \right) F_i$$

where $F_i$ is the amount of manually applied force exerted on the top 83a of the handle 80a, $\underline{a}$ is the arcuate distance over which that top travels as handle 80a is pushed from its leftward position to its rightward position shown in solid line and phantom, respectively, in FIG. 2, h is the vertical distance (height) by which the lip 46a of shoe 50a is raised as a result of that pushing of the handle 80a, $F_0$ is the increased force exerted upward by lip 46a (in the presence of a load thereon) in response to the manually applied force exerted on the handle top, and the value of the ratio (a/h) is the average mechanical advantage provided by the interaction of the lever 80a and the parallelogram linkage 70a. Typically, the arcuate throw of the handle top 83a is 30 inches and the height by which lip 46a is raised by that throw is 1½ inches to yield a mechanical advantage with a value of about 20.0 As a result, a person is capable of lifting 600 pounds of weight by the exertion of a mere average of 30 pounds of hand force on the handle 83a.

From what has been described, it is clear that the linkage 70a and lever handle 80a together form a jack means and that such jack means and shoe 50a together form on support beam 20a a lifting means for raising loads by the lower portion of lip 46a of the shoe 50a.

As earlier stated, the left hand lifting device 15b is a mirror image of the lifting device 15a just described but is otherwise a duplicate of that device. During use of the transporter vehicle 10, the two devices 15a and 15b are joined at their rear and front ends by the rear and front tie bars 16 and 17. Rear tie bar 16 is provided by an "L" shaped angle iron having at its right hand end a pair of holes therein for reception of the bolts 41a, 42a, on the device 15a, and having at its left hand end another pair of holes for reception therein of corresponding bolts 41b, 42b on the device 15b. Tie bar 16 maybe coupled to device 15a by only one or by both of bolts 41b, 42a and, similarly, may be coupled to device 15b by only one or by both of bolts 41b, 42b.

If the bar 16 is assembled with devices 15a, 15b to be coupled to each thereof by either one or two bolts as just described, the tie bar forms with those devices a horizontal platform constituting an articulated frame 90 which has a horizontal centerplane, and which borders the opening 12, and in which the frame elements 15a, 15b and 16 are constrained by the couplings between the bar 16 and devices 15a, 15b (and especially by the feature that the bolt holes of those couplings are surrounded by large extents of the horizontal webs through which those holes pass and belonging to the elements 15a, 15b and 16) to all remain angularly fixed in the vertical direction relative to the horizontal centerplane of the frame. If, however, the coupling within frame 90 of the tie bar 16 to either one of devices 15a, 15b is only by one of the mentioned bolts not fully tightened, then that device and the bar are relatively angularly adjustable in the horizontal direction. On the other hand, if the coupling within frame 90 of the tie bar 16 to either of devices 16 and 17 is by two of the mentioned bolts, then that tie bar and device are relatively angularly fixed in position in the horizontal direction.

The front tie bar 17 is provided by an "L" shaped angle iron having, at its right hand end, a hole for receipt therein of bolt 27a on device 15a and, at its left hand end, a hole for receipt therein of the bolt 27b on device 15b for coupling the tie bar 17 to the latter device. The couplings between tie bar 17 and devices 15a, 15b are non-rigid in the sense that, if the coupling between that tie bar and either of such devices is by a bolt which is not fully tightened, then the tie bar and that device are relatively angularly adjustable in the horizontal direction but, except for play, are not so adjustable in the vertical direction for the same reason as earlier explained in connection with the couplings between devices 15a, 15b and tie bar 16.

By the incorporation of both the tie bars 16 and 17 into the platform 90. The frame or platform has imparted thereto a closed loop configuration by virtue of which the frame extends entirely around the periphery of the opening 12 of the transporter. Such closed loop configuration for the frame or platform is preferred but not necessary. That is, there are applications of the invention in which the tie bar 17 may be dispensed with so as to impart to the frame provided by the platform 90 a configuration in the form of a "U" having vertical sides and a horizontal bottom. The use of the tie bar 17 in platform 90 has, however, the advantage that, even if the devices 15a, 15b are coupled by only one bolt each to the rear tie bar 16, the use in the frame of the front tie bar will maintain the devices 15a and 15b in parallel alignment with each other.

Use of the Embodiment

Figure 3:
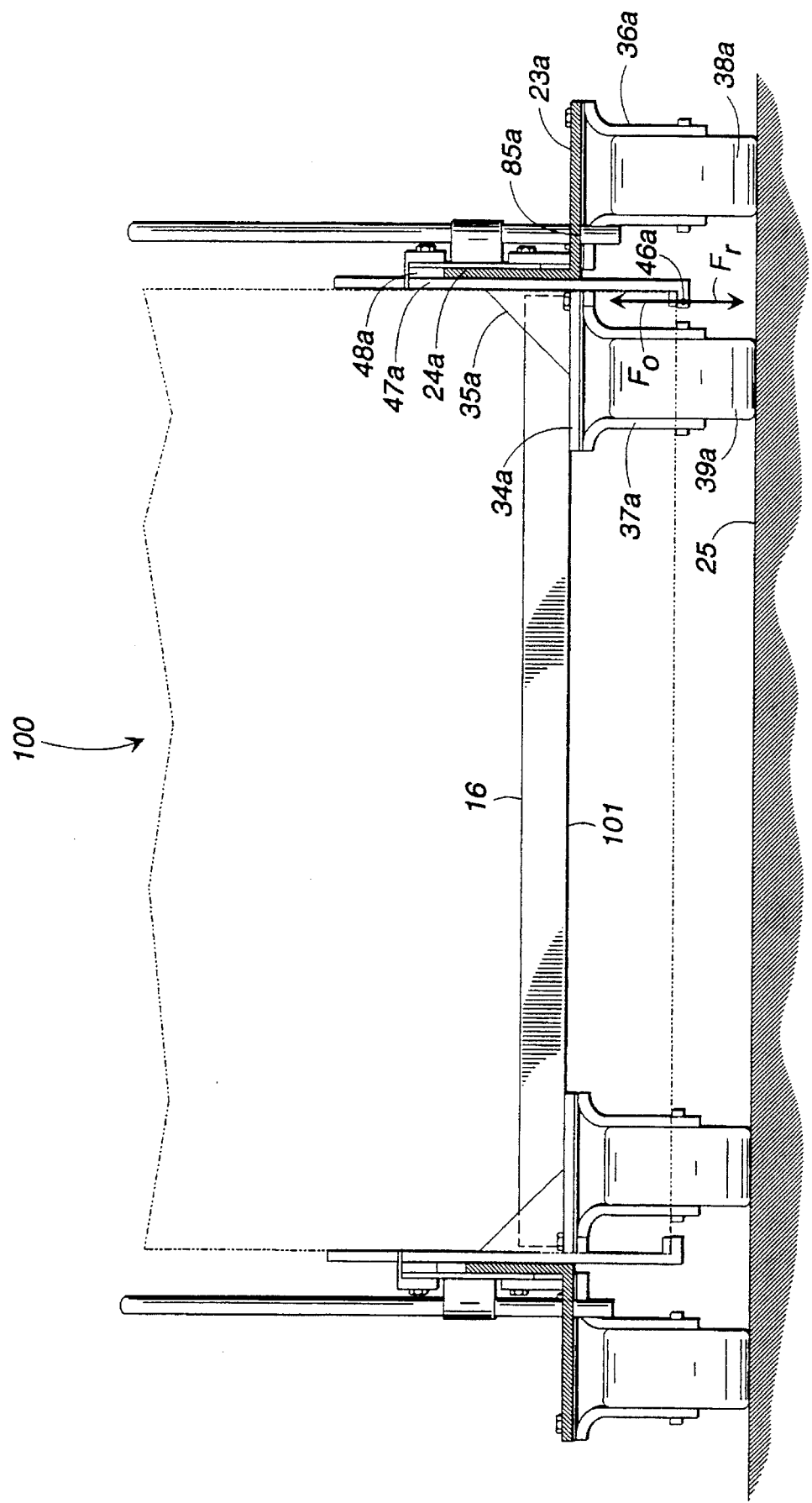
FIG. 3 is a front elevation in cross-section, taken as indicated by the arrows 3—3 in FIG. 1, when both the left and right load lifting devices have been actuated to lift the mentioned load which is shown in phantom in FIG. 3.
Figure 4:
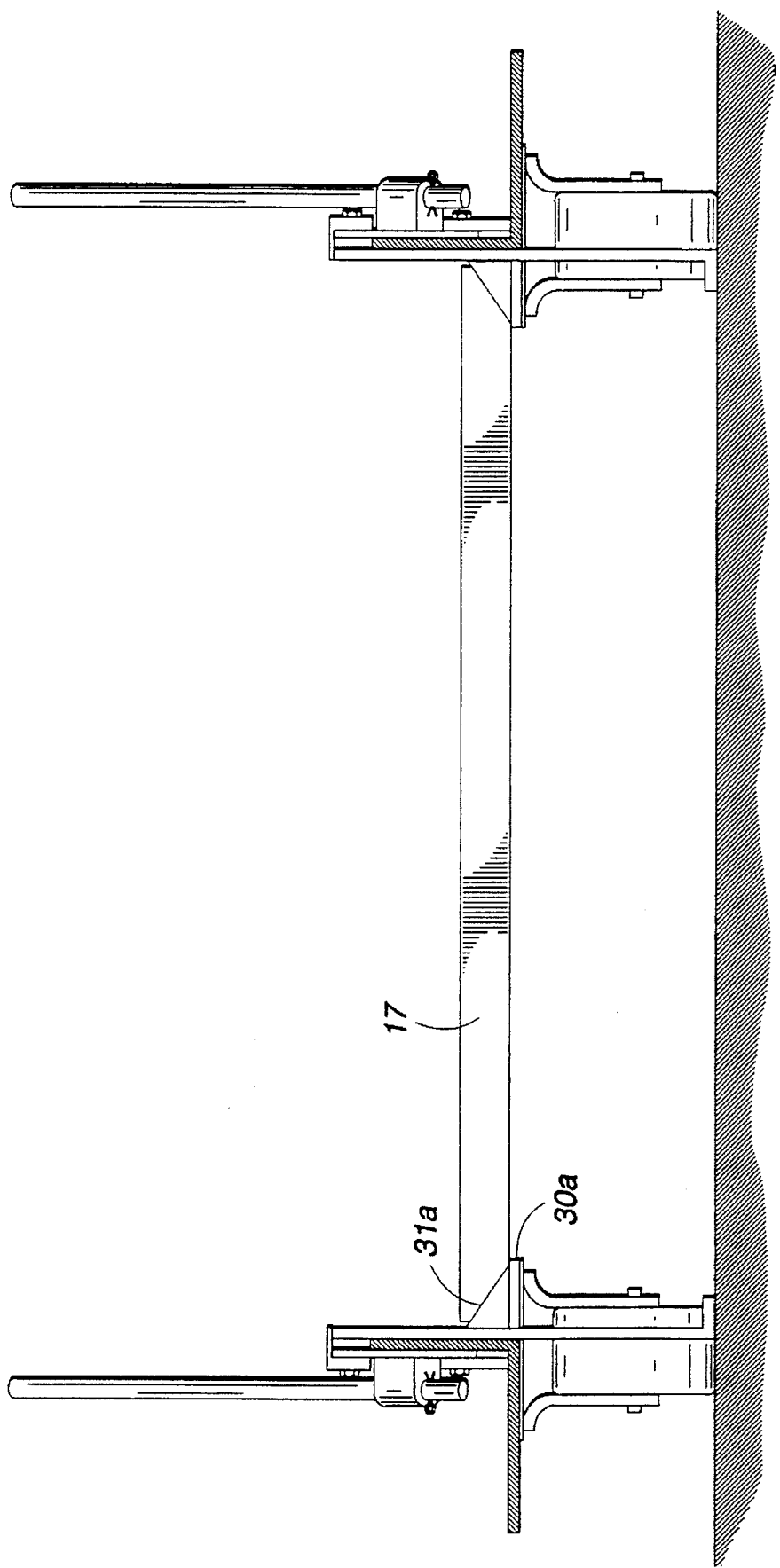
FIG. 4 is a rear elevation in cross-section, taken as indicated by the arrows 4—4 in FIG. 1, when both the left and right lifting devices are in arcuated or "ready" condition.

In FIGS. 2 and 3, the reference numeral 100 designates a load to be transported. The shown load 100 comprises an upright high-standing case 101 of rectangular parallelopiped form and seated on floor 25, telecommunications equipment (not shown) housed in the case and heavy enough to bring the weight of the load to 1100 pounds and leveling screws 102 supporting the case 101 a slight distance above floor 25 to form a crevice 103 between the floor and the bottom of the case.

As a preliminary to transporting load 100, the transporter vehicle 10 is brought into proximity therewith and then positioned with respect thereto so that the lower part of the load is disposed in the opening 12 between the left and right devices 15a and 15b. In order to effect such positioning it is necessary that the frame 90 be disassembled to the extent of being absent at least one of its frame members 15a, 15b 16 and 17 (the absent frame member preferably being the bar 17) since otherwise the opening 12 would be completely surrounded by frame 90, and there would be no way to get the load inside the frame.

Consonant, however, with that requirement of the absence of at least one of those frame members from frame 90, the frame can, to begin with, be in any one of its possible conditions of full or partial disassembly, as, for example, in the conditions where (a) all of frame elements 15a, 15b, 16 and 17 are uncoupled from each other (b) devices 15a and 15b are each coupled by one bolt to tie bar 16, and (c) devices 15a and 15b are coupled by two bolts to the tie bar 16. Whichever of those three conditions is most convenient to use will depend on the topography of the underside of load 100 but it is necessary, in any event, to start with the frame 90 in an initial condition permitting the lips 46a, 46b of the lifting devices 15a, 15b to be inserted on laterally opposite sides of load 100 into the crevice 103 beneath the case 101.

Assume that the initial condition selected for frame 90 is (b) so that devices 15a and 15b are connected by one bolt each to the tie bar 16, and so that the beams 20a, 20b of devices 15a, 15b make obtuse angles with the tie bar 16 on the sides of those frame elements bordering the opening 16. As a first step, that partly completed frame is positioned to bring tie bar 16 longitudinally close to and parallel to the back side of the load, with the couplings of the tie bar with the beams being on laterally opposite sides of the load. Then, the free ends, of the beams 20a, 20b are swung towards each other to position the lips 46a and 46b of lifting devices 15a, 15b in crevice 103 on the right and left hand sides of the load. Next, tie bar 17 is connected by bolts to beams 20a, 20b to bring them into parallel alignment. After that, tie bar 17 is adjusted to produce orthogonal alignment between the beams 20 of the frame and the tie bars 16 and 17. Subsequently, all the bolts then used for coupling frame elements 15a, 15b, 16, 17 together are tightened enough to prevent, except for play, angular departure in the vertical direction of any of those elements from the horizontal center plane off the frame but loose enough so that such elements are relatively angularly adjustable in the horizontal direction. The transporter vehicle 10 is now fully ready to pick up and carry the load 100.

The pick-up of the load can easily be accomplished by one person (the "operator") as follows. At the time considered, the lips 46a, 46b of the lifting devices are both in their down position (as shown in FIG. 3) to be just above floor 25 and beneath the bottom of case 101. Moreover, both of those lips have a horizontal positioning relative to the frame 90 which is towards its forward end, and which is shown, for lip 46b, in FIG. 1, and for lip 46a, in solid line in FIG. 2.

To lift the load, the operator pushes first, say the lever handle, 80a of right hand device 15a in the rearward direction to shift parallelogram linkage 70a of the lift device from its non-orthogonal to its orthogonal configuration as earlier described and, as a result, to produce, first, engagement between lip 46a and the bottom of case 101 and, second, a vertical movement of lip 46a from its down position to its up position and a corresponding raising upward by the lip of the right hand side of case 101. The operator then locks lip 46a in up position and the linkage 70a in orthogonal configuration by inserting the lower tip 82a of lever 80a into the hole 85a in beam 20a.

The mentioned up movement of the right hand side of the case is accompanied by a tilt of the load towards the left since the leveling screws on its left hand side will remain on the floor 25. Inasmuch, however, as the up movement of lip 46a is only about 1½", that tilt is so small as to create no problem in the lifting of the load. What is important is that the operator by a single motion is able to easily raise one-half the weight of the load (such one-half weight being 650 pounds) and to hold one side of the load locked in raised position above the floor.

The vertical up movement of lip 46a is accompanied by a horizontal shifting of the lip, relative to frame 90, from a forward position to the rearward position shown in FIG. 1 and in phantom in FIG. 2. FIG. 2 might suggest that such rearward relative movement between the lip and frame is produced by a rearward movement of the lip relative to the floor 25. What happens in fact, however, is that, because the left side of the load is still resting on the floor, the lip 46a remains stationary relative to the floor while the lifting device 15a undergoes a retrograde forward rolling movement over floor 25 in order to provide the relative movement just described between the lip 46a and the frame 90a. Lifting device 15b at this time is preferably kept horizontally stationary relative to floor 25, the coupling bolts then in frame 90 being kept lose enough to permit the described retrograde movement of lift device 15a relative to device 15b.

When the jack means on left device 15a exerts on lip 46 an upward force $F_0$ for raising the right hand side of load 100, the load exerts on that lip an opposite and equal reactive force $F_r$. The force $F_r$ can, for analysis purposes, be considered to be a concentrated force acting on lip 46a at its horizontal center. Since that center is horizontally inward of the beam 20a from which the active force $F_0$ is originally exerted, the reactive force $F_r$ develops on beam 20a a counterclockwise (FIG. 3) moment of force tending to upset the beam. Inasmuch, however, as the horizontal center of lip 46a is disposed in the sidewise direction for beam 20a laterally between rear wheels 53a and 54a, those wheels produce a counteractive moment of force which cancels out the moment of force from reactive force $F_r$. The wheels 53a, 54a thus stabilize the lift device 15a from being upset in the course of lifting the right side of load 100 to its held raised position above floor 25. Such stabilization of lift device 15 by its pair of laterally spaced angularly fixed rear wheels occurs irrespective of whether or not the device is coupled to one or both of tie bars 16, 17, or if so coupled, irrespective of the looseness or tightness of the coupling.

While the right hand side of the load is being so raised by lift device 15a, the left hand lift device 15b is in its initial condition shown in FIG. 1 wherein the handle 80b of the device is in forward position and the lip 46b is vertically in down position and horizontally at a position where it is displaced towards the forward end of the frame 90. Having lifted the right side of load 100, the operator now completes the lifting job by pushing the handle 80b to its rearward position to thereby shift with mechanical advantage the parallelogram linkage in device 15b from its non-orthogonal configuration to its orthogonal configuration, and to shift the lip 46b on that device vertically from its down to its up position. The lower tip 82b of the handle 80b of beam 20b is then advanced into the hole 85b in the horizontal beam web 23b of device 15b to thereby lock such linkage and lip in, respectively, the condition and position just described. As a result, the left hand side of load 100 is lifted to and held at a raised position above floor 25 at the same distance from the floor as the right hand side of the load is now held. That is, the tilt in the load has been removed and the load is now fully upright (FIG. 3) and ready for transportation.

In the course of lifting the left hand side of the load, the lip 46b undergoes relative to beam 20b a horizontal rearward displacement which translates into a forward displacement of beam 20b relative to the beam 20a, of device 20a. The result of that forward relative displacement of beam 20b is to change the frame 90 from the slightly skewed alignment it assumed when lift device 15a was operated back to an alignment in which the beams 20a, 20b are orthogonal with the tie bars 16 and 17. Once the frame 90 has regained that orthogonal alignment, the bolts previously missing from the coupling of beams 20a, 20b with the bar 16 are inserted to convert those couplings from one bolt to two bolt couplings. As a result, the beams 20a, 20b became fixedly angularly connected in the horizontal direction with the tie bar 16, and the frame 90 as a whole is rendered a rigid frame. Thereupon, the coupling bolts now included in frame 90 are fully tightened, and the transporter vehicle 10 is in completely ready to be hand propelled to transport the load 100 over floor 25.

The above described embodiment being exemplary only, it is to be understood that additions thereto, omissions therefrom and modifications thereof can be made without departing from the spirit of the invention. For example, without restriction, the loads capable of being lifted and conveyed by a transporter vehicle according to the invention are not limited to the specific kind of load described and shown herein but, rather, may be any kind of load which is disposable between two lifing devices and is engageable by those devices to be lifted on opposite sides thereby. Accordingly, the invention is not to be considered as limited save as is consonant with the recitals of the following claims.

I claim:

1. A load lifting device comprising a lengthwise elongated beam, relatively forward and rearward lengthwise-spaced wheel means mounted on and beneath said beam for assisting in movement of the load lifting device, and hand actuated lifting means mounted on said beam between said forward and rearward wheel means for vertically displacing a load, said lifting means having a horizontally-extending lower portion with a horizontal center projecting out in a sidewise direction away from one side of said beam and engageable with said load on said one side for exerting on said load an upward lifting force, said forward wheel means comprising a single wheel swivelably mounted on said beam and said rearward wheel means comprising a pair of wheel means angularly fixedly mounted relative to said beam and spaced from each other in said sidewise direction on each side of a plane which extends parallel to said beam and intersects the horizontal center of said lower portion to thereby stabilize said beam against overturning by a moment produced by a reactive force of said load on said beam.

2. A transporter for loads comprising first and second laterally spaced horizontal support beams longitudinally extending between relatively forward and rearward portions thereof, forward and rearward wheels underneath each beam to make said transporter rollable over a floor, and at least one rigid elongated tie means extending between and connecting said beams by securing means for swingably supporting said beams for movement toward and away from each other on opposite sides of a load seated on said floor and bounded on laterally opposite sides thereof by said beams, said transporter further comprising first and second shoes respectively carried by said first and second beams to be movable relative thereto between up and down positions, said shoes having respective horizontally-extending lower portions which, when said shoes are down, are lodgeable beneath laterally opposite sides of said seated load when said beams are swung toward each other, for lifting said load by upward movement of said shoes, and first and second hand actuated jack means respectively mounted on said first and second beams by mounting means and coupled with said first and second shoes for vertically displacing said load, said jack means being responsive to respective exertions thereon of manually applied forces to vertically displace their corresponding shoes so as to lift said load to a raised position above said floor, at which time said load is transportable over said floor by rolling said transporter and said raised load.

\* \* \* \* \*